US006278252B1

(12) United States Patent
Kachouh

(10) Patent No.: US 6,278,252 B1
(45) Date of Patent: Aug. 21, 2001

(54) ELECTRIC MOTOR-DRIVEN SERVO-DRIVE FOR A MOTOR VEHICLE LOCK

(75) Inventor: Checrallah Kachouh, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/492,834

(22) Filed: Jan. 27, 2000

(30) Foreign Application Priority Data

Dec. 3, 1999 (DE) ........................................ 199 58 288

(51) Int. Cl.[7] ........................................ G05B 5/01

(52) U.S. Cl. .................. 318/466; 318/266; 292/DIG. 23

(58) Field of Search .................................. 318/466, 467, 318/468, 266, 286; 292/DIG. 23

(56) References Cited

U.S. PATENT DOCUMENTS 4,502,718 * 3/1985 Sasaki et al. .................... 292/336.3
5,240,296 8/1993 Kobayashi .......................... 292/201
5,453,671 * 9/1995 Baier et al. ......................... 318/466
5,656,899 * 8/1997 Kuroda ................................ 318/283
5,762,384 * 6/1998 Bartel .................................. 292/216
5,786,675 * 7/1998 Niki et al. ........................... 318/466
6,114,821 * 9/2000 Kachouh .............................. 318/466

FOREIGN PATENT DOCUMENTS 43 34 522 C1 1/1995 (DE) .
44 33 042 10/1995 (DE) .

* cited by examiner

*Primary Examiner*—Robert E. Nappi
*Assistant Examiner*—Rita Leykin
(74) *Attorney, Agent, or Firm*—Nixon Peabody LLP; David S. Safran

(57) ABSTRACT

An electric motor-driven servo-drive for a motor vehicle lock in which, instead of an AND gate implemented using circuitry with two switches, a mechanical AND gate using an actuating element (10) or a magnetic sensor is used with a single switch.

6 Claims, 3 Drawing Sheets

FIG. 4(a)
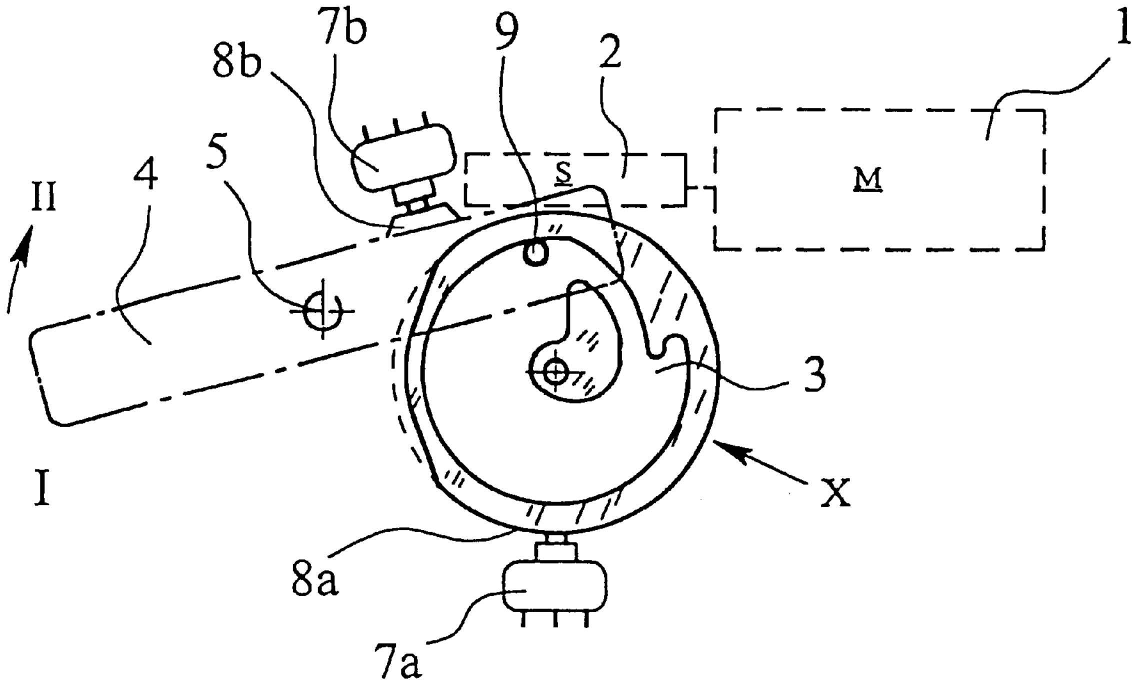
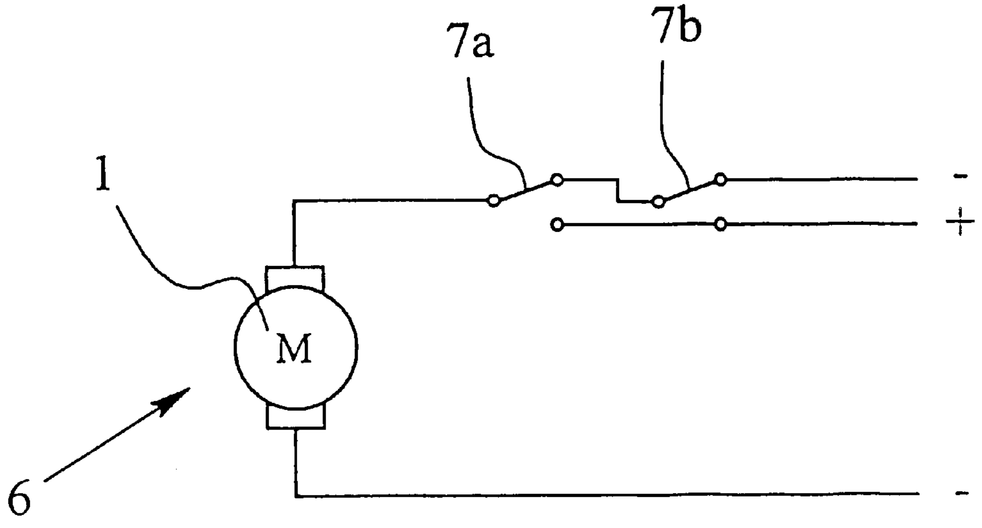
FIG. 4(b)
(Prior Art)

ELECTRIC MOTOR-DRIVEN SERVO-DRIVE FOR A MOTOR VEHICLE LOCK

BACKGROUND OF THE INVENTION

1. Field of the Invention

The invention is directed to an electric motor-driven servo-drive for a motor vehicle lock with an electric drive motor, a servo-drive disk or other servo-drive element which is driven by the electric drive motor, an operating lever, or another mechanical operating element, which can be moved back and forth by the servo-drive element between at least two operating positions, and with an electric motor control with which the electric drive motor can be turned on and can be turned off, especially short circuited, by an electrical or electronic switch connected to the electric motor control in a certain free position of the servo-drive element and with simultaneous occurrence of the operating position of the operating lever 2. Description of Related Art In known electric motor-driven servo-drives for motor vehicle locks, two electrical or electronic switches are connected to the electric motor control, in any case, specifically a first switch for the servo-drive element and a second switch for the operating lever (U.S. Pat. No. 5,240,296). In the sense of a series connection of the two switches which leads in terms of computer engineering to an AND gate, the electric drive motor is turned off when the two switches are activated. Generally, the electric drive motor is turned off by short circuiting it in order to achieve a motor braking action, and thus, rapid shutdown of the servo-drive element (see, also German Patent DE - C - 43 34 522).

SUMMARY OF THE INVENTION

A primary object of the present invention is to reduce the circuit engineering cost in the above described electric motor-driven servo-drive for a motor vehicle lock.

This object is achieved in an electric motor-driven servo-drive for a motor vehicle lock of the type described at the outset by the provision of only one electric switch and this switch being mechanically arranged such that it can be influenced both by the servo-drive element and the operating element, and by a mechanical actuating element being assigned to the switch. Alternatively, the object of the invention can be obtained by the provision of only one electric switch and this switch being mechanically arranged such that it can be influenced both by the servo-drive element and the operating element, and by the switch being a proximity-activated sensor, the servo-drive element and the operating element being influencing elements of the proximity-activated sensor, and wherein an operating function of the switch takes place only when the sensor is influenced by the both influencing elements.

Motor vehicle locks can be used in many areas in a motor vehicle, especially as motor vehicle side door locks, rear door locks, rear hatch locks, sliding door locks, hood locks, and the like. In this sense, the concept of a motor vehicle door lock should therefore be understood comparatively comprehensively. In the specification of this patent application, the servo-drive disk is described as the servo-drive element, but all other types of servo-drive elements, for example, also spindle drives, are usable and are also intended to be encompassed by the term servo-drive element. Broad freedom likewise applies to the operating element which is described here as a mechanical operating lever. Thus, the operating element can be a linearly shifted operating element, a swiveling or pivoting operating element, or also a rotating operating element.

It has been recognized in accordance with the present invention that the series connection provided in the prior art, which leads in terms of computer engineering to an AND gate, also requires the existence of two microswitches, can be replaced by a mechanical actuating element for the AND gate or by choosing an operating threshold of a proximity actuated sensor as the switch. This saves a comparatively expensive switch.

The electrical or electronic switch can be, first of all, a microswitch with a first position which is assumed under a spring load and a second position which is reached against the spring load. However, also proximity-actuated electromagnetic or electronic switches (Reed relays, Hall sensor switches, etc.) can be used. Here, there are a host of possibilities which can be taken from the prior art and which will not be explained individually here.

In a first alternative, a mechanical actuating element, preferably in the form of a rocker, allows the switch to be influenced only when it has been actuated by two influencing elements. This mechanically accomplishes the AND gate.

The second alternative, especially in implementation of the switch as a sensor sensitive to magnetic fields, accomplishes the AND gate by an operating threshold of the sensor such that only the simultaneous influence by the two influencing elements causes the operating threshold to be exceeded and thus results in operation.

In the following the invention is explained in detail using drawings which show representative embodiments of the invention.

BRIEF DESCRIPTION OF THE DRAWINGS

FIG. 4(*a*) shows an electric motor-driven servo-drive with a motor control of the prior art having a series connection of two electrical switches as shown in FIG. 4(*b*).

DETAILED DESCRIPTION OF THE INVENTION

Figure 1:
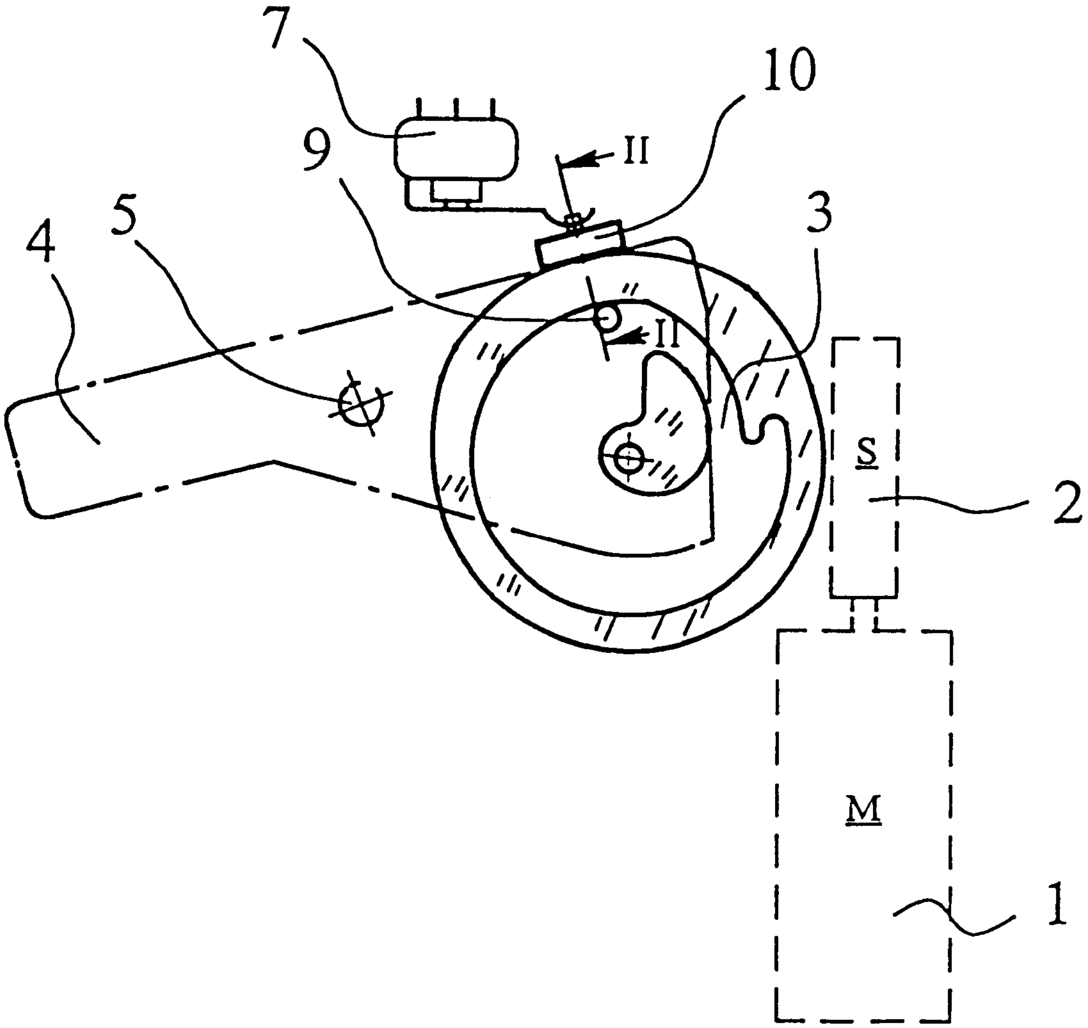
FIG. 1 shows an embodiment of an electric motor-driven servo-drive with an electromechanical switch which is arranged and used in accordance with the invention, with the servo-drive in the "locked," but not the "antitheft," position.

The basic principle of an electric motor-driven servo-drive of the type under consideration will be explained using FIGS. 4(*a*) & 4(*b*). FIG. 4(*a*) shows an electric, motor-driven servo-drive for a motor vehicle lock, for example, a motor vehicle rear door lock, the corresponding alternatives already having been explained in the Summary part of the specification. An electric drive motor 1 is shown which drives via a worm 2 or a spindle, and a servo-drive element which is shown here, by way of example, as a servo-drive disk 3 or a worm wheel. In the Summary part of the specification, it has likewise already been pointed out which numerous other forms of servo-drive elements can be accomplished here.

An operating lever 4 is pivotally mounted on a bearing axle 5 so that it can be moved back and forth by the servo-drive element 3 between at least two operating positions I, II. It can also be another mechanical switching element 4, for example, a slide or a rotary part.

FIG. 4(*b*) shows an electric motor control 6 for control of the electric drive motor 1 and with which the electric drive motor 1 can be turned on, and in a certain free position X of the servo-drive element 3 and with simultaneous occurrence of the operating position I of the switching element 4 shown in FIG. 4*a*, can be turned off. In the prior art embodiment shown in FIG. 4(*b*), there are two switches 7*a*, 7*b* for this purpose; they are connected to the electric motor control 6. Each of the switches 7 automatically assumes a first position "0" and when influenced by the influencing element, assumes a second position "1." In this embodiment, this result is obtained by each of the switches 7 being spring loaded and having the capacity to be actuated by a control crank 8*a*on the servo-drive element 3 or by a control crank 8*b* on the operating lever 4 against spring force.

In another embodiment of the switches 7, they can be actuated without contact by installing corresponding magnetic bodies in the influencing elements, therefore the servo-drive element 3 and the switching element 4. This is widely known from the prior art, as can be seen by reference to the corresponding prior publications on this topic such as published German Patent Application DE - A - 44 33 042.

It is shown in FIG. 4(*b*) that the two series connected contacts of the switches 7*a* and 7*b* lead to a short circuiting of the electric drive motor 1 occurring only when the two switches 7*a* and 7*b* are both activated. This is the case when the position shown in FIG. 4(*a*), on the one hand, of the servo-drive element 3, and on the other hand, of the operating lever 4, is reached. This position corresponds to the "locked" position of the motor vehicle door lock, a position in the "free space" between an "unlocked" end position, and the other, "locked-antitheft" end position. The two end positions are reached in this preferred example by the servo-drive element 3 running against the journal 9 on the operating lever 4 (blocking mode; evaluation of the increased power consumption of the electric drive motor or time-out). Also here, there are various models in the prior art to which reference should be made.

According to the teaching of the present invention, it is provided that the AND gate which is implemented using circuitry in the prior art, and which presupposes two switches, is replaced by a mechanical AND gate which presupposes only a single switch 7 in a first embodiment.

Figure 2:
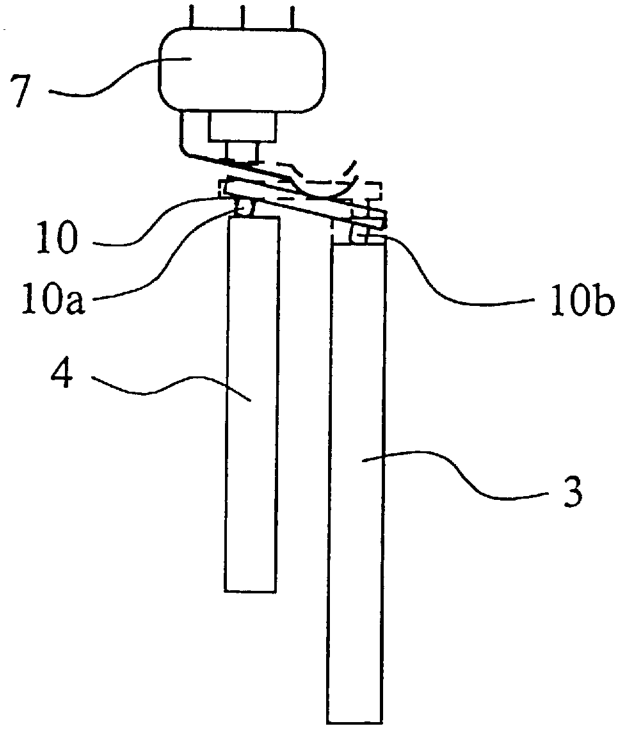
FIG. 2 is a sectional view taken along line II—II in FIG. 1.

It is provided in accordance with the invention that there is only one electrical switch 7 and this single switch 7 is mechanically arranged such that it can be influenced both by the servo-drive element 3 and also by the operating element 4, that a mechanical actuating element 10 is assigned to the switch 7, that the servo-drive element 3 and the operating element 4 act on the actuating element 10 and the actuating element 10 acts on the switch 7, and that the switch 7 is actuated only when the actuating element 10 is actuated both by the servo-drive element 3 and also by the operating element 4. FIG. 1 shows the actuating element 10 between the switch 7 and the influencing elements 3, 4. FIG. 2 shows the actuating element 10 in the form of a preferably spring-loaded rocker which has two rocker ends 10*a*, 10*b*, and which is supported at the tip of the switch 7.

The solid lines in FIG. 2 show the situation in which the actuating element 10 has been actuated only by the operating element 4. In this case, the rocker which forms the actuating element 10, has been simply inclined, and the switch 7 has not changed its position. The situation which occurs when the servo-drive element 3 also influences the actuating element 10 is shown by a broken line. At this point, the actuating element 10 can no longer deviate, and the switch 7 is actuated. In this way, a mechanical AND gate is mechanically accomplished.

Figure 3:
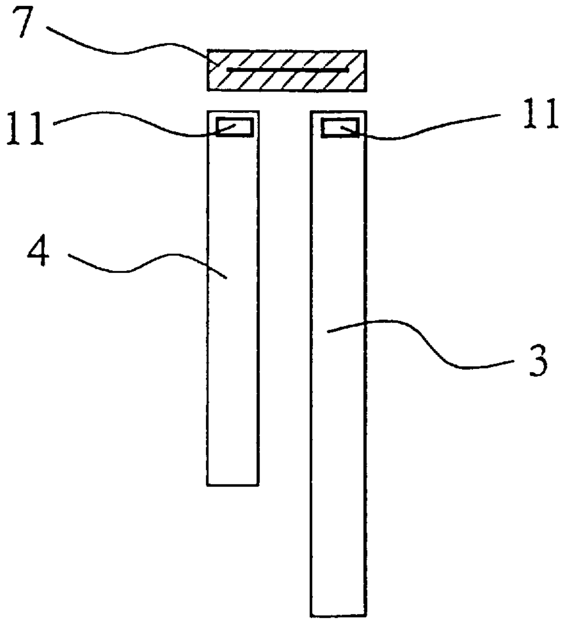
FIG. 3 is a view corresponding to that of FIG. 2, but showing a second embodiment of an electric motor-driven servo-drive in accordance with the invention.

In the embodiment as shown in FIG. 3, which shows a section as in FIG. 2, the switch 7 is influenced without contact. In this embodiment, the switch 7 is made as a sensor which is sensitive to magnetic fields. The servo-drive element 3 and the operating element 4 each have a magnet body 11 which is located at the correspondingly suitable location. If there is only one magnet body 11 in the response field of the magnetically sensitive sensor, for example, a Hall sensor which forms the switch 7, the operating threshold is not reached. If also the second magnet body 11 enters the response field of the magnetically sensitive sensor, the operating threshold is exceeded, and the operating function of the switch 7 is triggered. This is an AND gate accomplished without contact.

In both cases, it has been possible to eliminate the second switch used in the prior art, and the savings effect is considerable.

I claim:

1. Electric motor-driven servo-drive for a motor vehicle lock, comprising:

an electric drive motor;

a servo-drive element which is driven by the electric drive motor;

a mechanical operating element mounted to be moved back and forth by the servo-drive element between at least two operating positions; and an electric motor control means for turning on the electric drive motor and for turning the electric drive motor off in a predetermined free position of the servo-drive element when one of the operating positions of the mechanical operating element occurs simultaneously with the servo-drive element being in said predetermined free position; wherein only one electrical or electronic switch is provided, which is connected to the electric motor control means and mechanically arranged to be acted upon by both the servo-drive element and the mechanical operating element; and wherein a mechanical actuating element is positioned between the electric or electronic switch and the servo-drive element and between the electric or electronic switch and the mechanical operating element, the servo-drive element and the mechanical operating element acting on the mechanical actuating element and the mechanical actuating element actuating the electric or electronic switch only when the mechanical actuating element is acted upon by both the servo-drive element and the mechanical operating element.

2. Electric motor-driven servo-drive as claimed in claim 1, wherein the mechanical actuating element is a rocker which has a first rocker end which is acted upon by the servo-drive element and a second rocker end which is acted upon by the operating element.

3. Electric motor-driven servo-drive as claimed in claim 1, wherein the operating element is a pivotable operating lever.

4. Electric motor-driven servo-drive for a motor vehicle lock, comprising:

an electric drive motor;

a servo-drive element which is driven by the electric drive motor;

a mechanical operating element mounted to be moved back and forth by the servo-drive element between at least two operating positions; and an electric motor control means for turning on the electric drive motor and for turning the electric drive motor off in a predetermined free position of the servo-drive element when one of the operating positions of the mechanical operating element occurs simultaneously with the servo-drive element being in said free position; wherein only one electrical or electronic switch is provided, which is connected to the electric motor control means and mechanically arranged to be acted upon by both the servo-drive element and the mechanical operating element; and wherein said switch is mechanically arranged such that it can be influenced both by the servo-drive element and the mechanical operating element; wherein the switch is a proximity-activated sensor; wherein the proximity-activated sensor is actuated only when influenced by both the servo-drive element and the mechanical operating element.

5. Electric motor-driven servo-drive as claimed in claim 4, wherein the switch is a magnetically sensitive switch; and wherein the servo-drive element and the operating element are equipped with magnet bodies that are arranged to act on the magnetically sensitive switch.

6. Electric motor-driven servo-drive as claimed in claim 4, wherein the operating element is a pivotable operating lever.

* * * * *